(No Model.)

C. BUSH.
PACKING AND GUARD FOR ADJUSTABLE SPIGOTS FOR KEGS, &c.

No. 457,768. Patented Aug. 18, 1891.

WITNESSES:
John Scott
J. Henderson

INVENTOR:
Curt Bush
By his Attorney,
Horace Pettit

United States Patent Office.

CURT BUSH, OF PENLLYN, PENNSYLVANIA.

PACKING AND GUARD FOR ADJUSTABLE SPIGOTS FOR KEGS, &c.

SPECIFICATION forming part of Letters Patent No. 457,768, dated August 18, 1891.

Application filed May 5, 1891. Serial No. 391,689. (No model.)

*To all whom it may concern:*

Be it known that I, CURT BUSH, of Penllyn, county of Montgomery, Pennsylvania, have invented a certain new and useful Improvement in Packings and Guards for Adjustable Spigots for Drawing Liquids from Kegs, Casks, Barrels, &c.; and I do hereby declare the following to be a full, clear, and exact description thereof, reference being had to the accompanying drawings, forming part of this specification.

My invention has relation to packings and guards for securing adjustable spigots firmly and tightly into kegs, casks, barrels, &c., and to prevent leakage between the outer circumference of the spigot-shank and the circumference of the bore in the kegs or casks; and it consists in the device hereinafter particularly described.

The object of my invention is, as before stated, to retain firmly and securely the spigot-shank in the orifice or bung of the barrel from which the liquid is to be drawn and to prevent leakage between the circumference of the spigot-shank and the edges of orifices or bung-hole provided in the keg or cask, and to provide a device so constructed that it shall not be forced upon the shank beyond the inner end thereof in being driven in and which at the same time may be readily adjusted to the shank and the shank with the packing device may be readily driven into the orifice into position without loss of time or requiring any skill in adjusting it.

In the accompanying drawings similar letters of reference refer to similar parts throughout.

Figure 1:
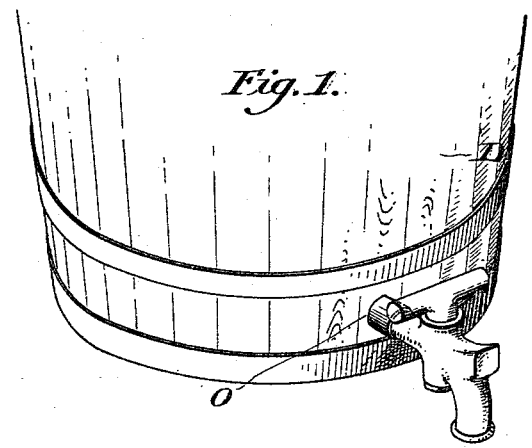
Figure 2:
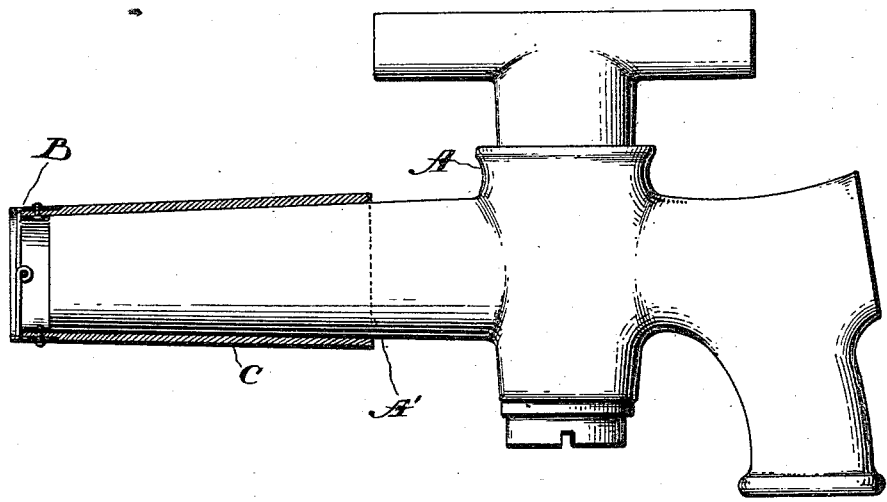
Figure 3:
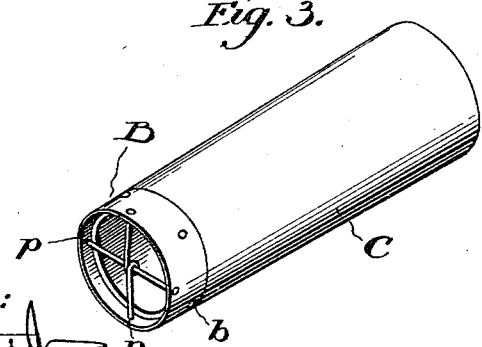

Figure 1 illustrates a spigot having my improvement secured thereon driven into the orifice provided in the lower end of a keg. Fig. 2 is a partially-sectional view showing in detail the relative position and adjustment of the securing device and guard in combination with the spigot. Fig. 3 represents the securing device or packing and guard detached from the spigot.

A represents an adjustable spigot of ordinary construction adapted to be driven into kegs, casks, &c. To the main shank A' of the spigot A is provided on the outer circumference a sleeve C or packing of rubber or other suitable material, preferably of an interior diameter equal to the exterior diameter of the shank A' of the spigot A, both of which are preferably made on a taper. At the lower or inner end of the sleeve C is provided a metal ring B, firmly secured to the said sleeve by rivets b or by other suitable means. Through the diameter of the metal ring B are provided guard-pins p, securely riveted or fastened in the said metal ring B. The main purpose of this guard, composed of the ring B and the pins p, (which may be any number desired,) is to prevent the sleeve C from being forced too far up on the shank A' of the spigot A in being driven into the cask, and, further, to give the sleeve a rigidity and to allow of the shank A' being more readily adjusted into the sleeve C. The ends of the pins p may, if desired, be inserted through the sleeve C, as well as into the metal ring B, and in being riveted thereto act as a substitute for the rivets b; but this is immaterial. The sleeve being readily adjusted to the shank A', the whole is then inserted in the orifice o, bored in the cask D, and the spigot driven by a mallet or other suitable means into the orifice o until it is bound tightly in position.

It will be noted that even though the orifice may be roughly bored, with edges somewhat ragged, the tendency of the elastic material of which the sleeve C is composed is to fill into the ragged edges, making a positive joint and prevent leakage.

I am aware that heretofore material of various kinds has been wrapped upon the outer circumference of the main shank of adjustable spigots for packing purposes, and this I do not claim broadly.

Having thus described my invention, what I claim, and desire to secure by Letters Patent, is—

A packing-sleeve C, a ring B, secured at one end of the said sleeve C, and pins p, rigidly provided within said ring B, substantially as described.

In witness whereof I have hereunto set my hand this 28th day of April, A. D. 1891.

CURT BUSH.

Witnesses:
HORACE PETTIT,
WILLIAM M. STEWART, Jr.